(12) United States Patent
Isokawa et al.

(10) Patent No.: US 8,724,435 B1
(45) Date of Patent: May 13, 2014

(54) MAGNETIC DISK HAVING REFLECTING LAYER IN RECORDING LAYER, MAGNETIC DISK DEVICE, AND THERMALLY ASSISTED MAGNETIC RECORDING METHOD

(71) Applicant: Kabushiki Kaisha Toshiba, Tokyo (JP)

(72) Inventors: Hiroshi Isokawa, Kanagawa (JP); Tomoko Taguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/778,851

(22) Filed: Feb. 27, 2013

(30) Foreign Application Priority Data

Dec. 12, 2012 (JP) .................................. 2012-271634

(51) Int. Cl.
*G11B 11/00* (2006.01)

(52) U.S. Cl.
USPC ...................... 369/13.38; 369/13.33; 428/833

(58) Field of Classification Search
USPC .......... 369/13.02, 13.13, 13.17, 13.33, 13.35, 369/13.38; 360/59, 131, 135; 428/833
See application file for complete search history.

(56) References Cited

U.S. PATENT DOCUMENTS

| | | | |
|---|---|---|---|
| 6,802,073 B1 * | 10/2004 | Takahashi et al. ............. | 720/718 |
| 6,821,596 B2 * | 11/2004 | Terao et al. ................... | 428/64.1 |
| 7,652,775 B2 | 1/2010 | Matsumoto | |
| 7,855,937 B2 | 12/2010 | Shimazawa et al. | |
| 8,355,300 B2 | 1/2013 | Grobis et al. | |
| 2003/0035361 A1 * | 2/2003 | Knight et al. ............ | 369/112.24 |
| 2007/0286031 A1 | 12/2007 | Matsumoto | |
| 2010/0061200 A1 | 3/2010 | Shimazawa et al. | |
| 2012/0082015 A1 * | 4/2012 | Grobis et al. ............... | 369/13.24 |

FOREIGN PATENT DOCUMENTS

| | | |
|---|---|---|
| JP | 05-274836 A | 10/1993 |
| JP | 2007-334936 A | 12/2007 |
| JP | 2010-061782 A | 3/2010 |
| JP | 2012-048792 A | 3/2012 |
| JP | 2012-079402 A | 4/2012 |

* cited by examiner

*Primary Examiner* — Brenda Bernardi
(74) *Attorney, Agent, or Firm* — Knobbe Martens Olson & Bear LLP

(57) ABSTRACT

According to one embodiment, in a magnetic disk, a reflecting layer with a higher reflectance to near-field light than a magnetic recording layer is provided in the magnetic recording layer so as to be flat. A magnetic head performs magnetic recording on the magnetic recording layer while locally heating the magnetic recording layer based on the near-field light.

12 Claims, 14 Drawing Sheets

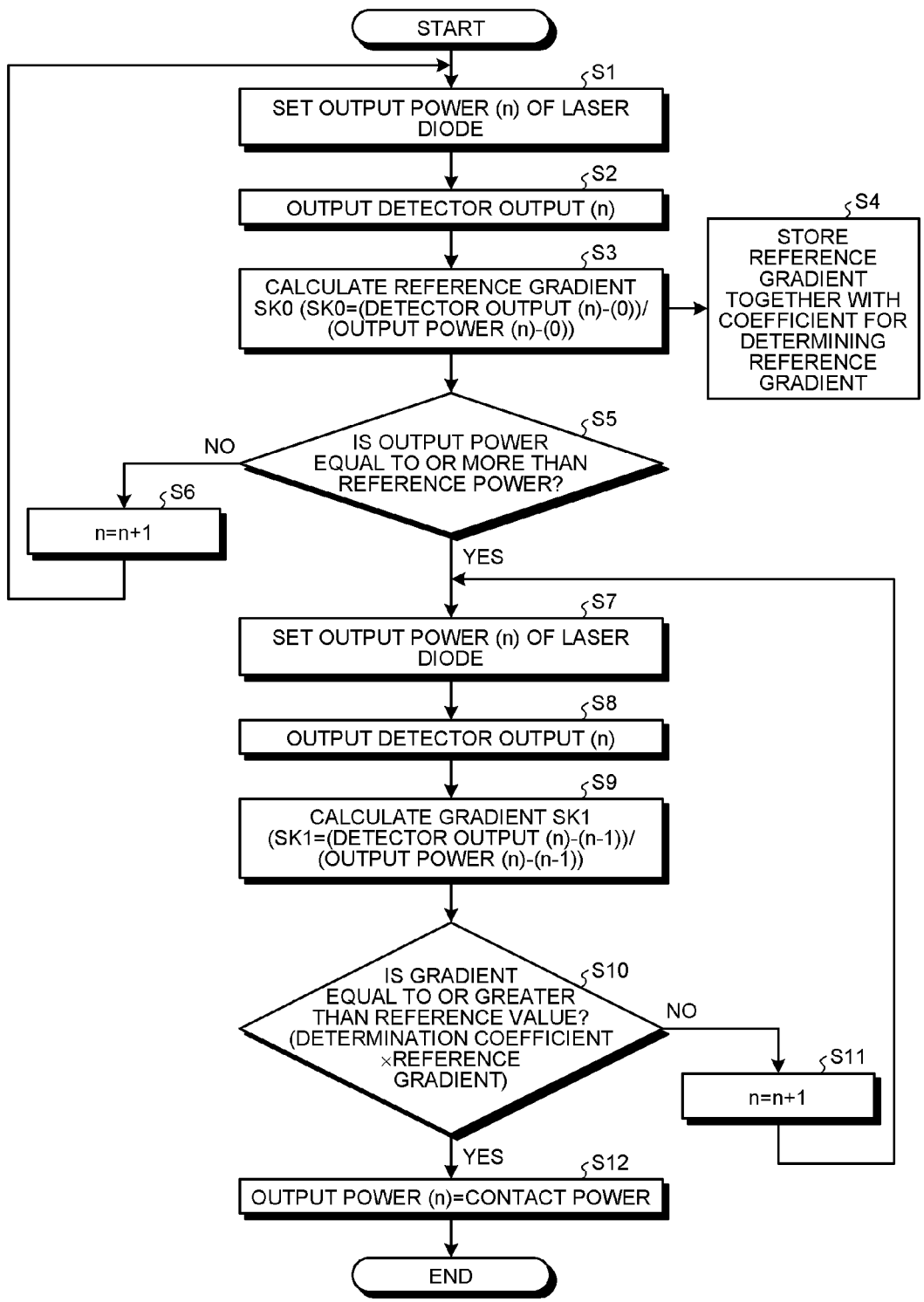

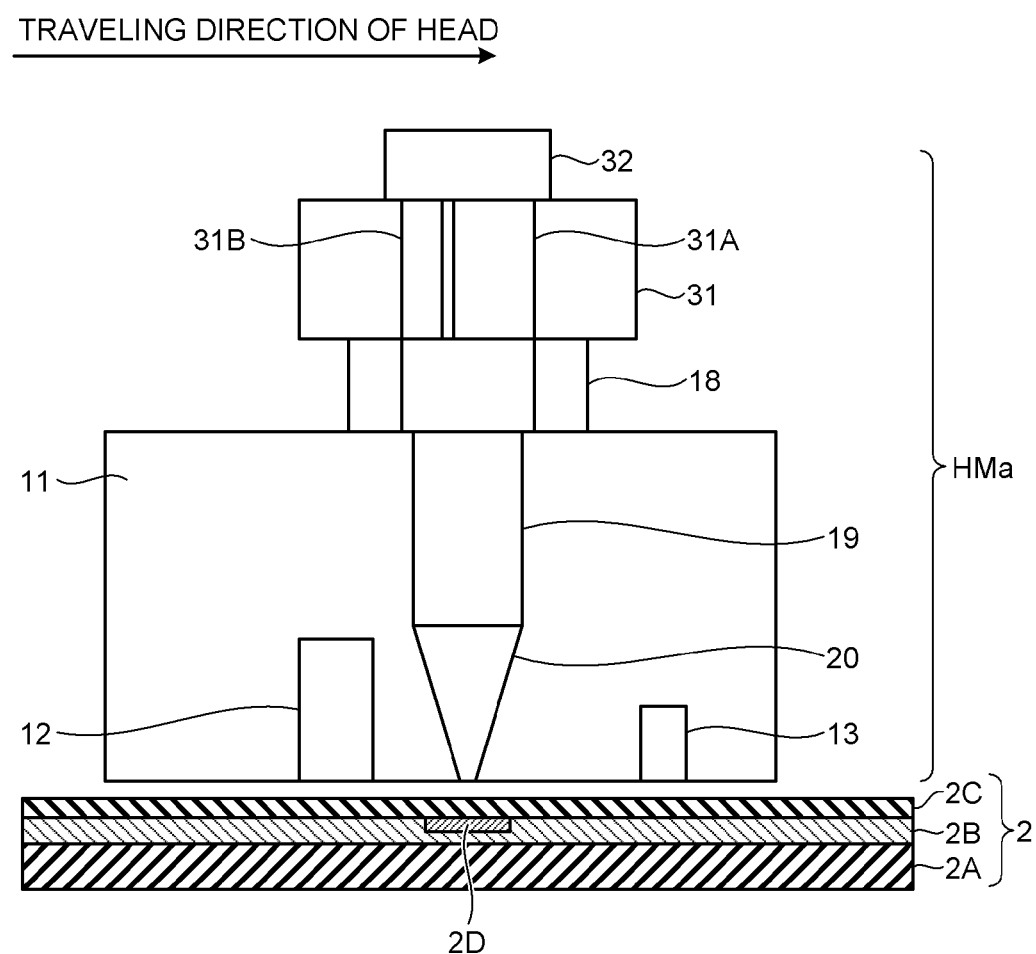

US 8,724,435 B1

MAGNETIC DISK HAVING REFLECTING LAYER IN RECORDING LAYER, MAGNETIC DISK DEVICE, AND THERMALLY ASSISTED MAGNETIC RECORDING METHOD

CROSS-REFERENCE TO RELATED APPLICATIONS

This application is based upon and claims the benefit of priority from Japanese Patent Application No. 2012-271634, filed on Dec. 12, 2012; the entire contents of which are incorporated herein by reference.

FIELD

Embodiments of the invention relate to a magnetic disk, a magnetic disk device, and a thermally assisted magnetic recording method.

BACKGROUND

There is a method of performing magnetic recording on the basis of near-field light while locally heating a magnetic recording layer in order to improve the recording density of a magnetic disk. Since the near-field light is not diffracted, it is possible to set a spot diameter to a wavelength equal to or less than a light wavelength and locally heat a region with the wavelength equal to or less than the light wavelength to perform magnetic recording.

BRIEF DESCRIPTION OF THE DRAWINGS

FIG. 7 is a flowchart illustrating an output power calculation method when the magnetic head illustrated in FIG. 1 contacts the magnetic disk;
FIG. 8 is a side view illustrating schematic structure of a magnetic head used in a magnetic disk device according to a second embodiment.

DETAILED DESCRIPTION

According to one embodiment, a magnetic disk device includes a magnetic disk and a magnetic head. In the magnetic disk, a reflecting layer with a higher reflectance to near-field light than a magnetic recording layer is provided in the magnetic recording layer so as to be flat. The magnetic head performs magnetic recording on the magnetic recording layer while locally heating the magnetic recording layer based on the near-field light. Hereinafter, magnetic disk devices according to embodiments will be described in detail with reference to the accompanying drawings. The invention is not limited by the embodiments.

First Embodiment

Figure 1:
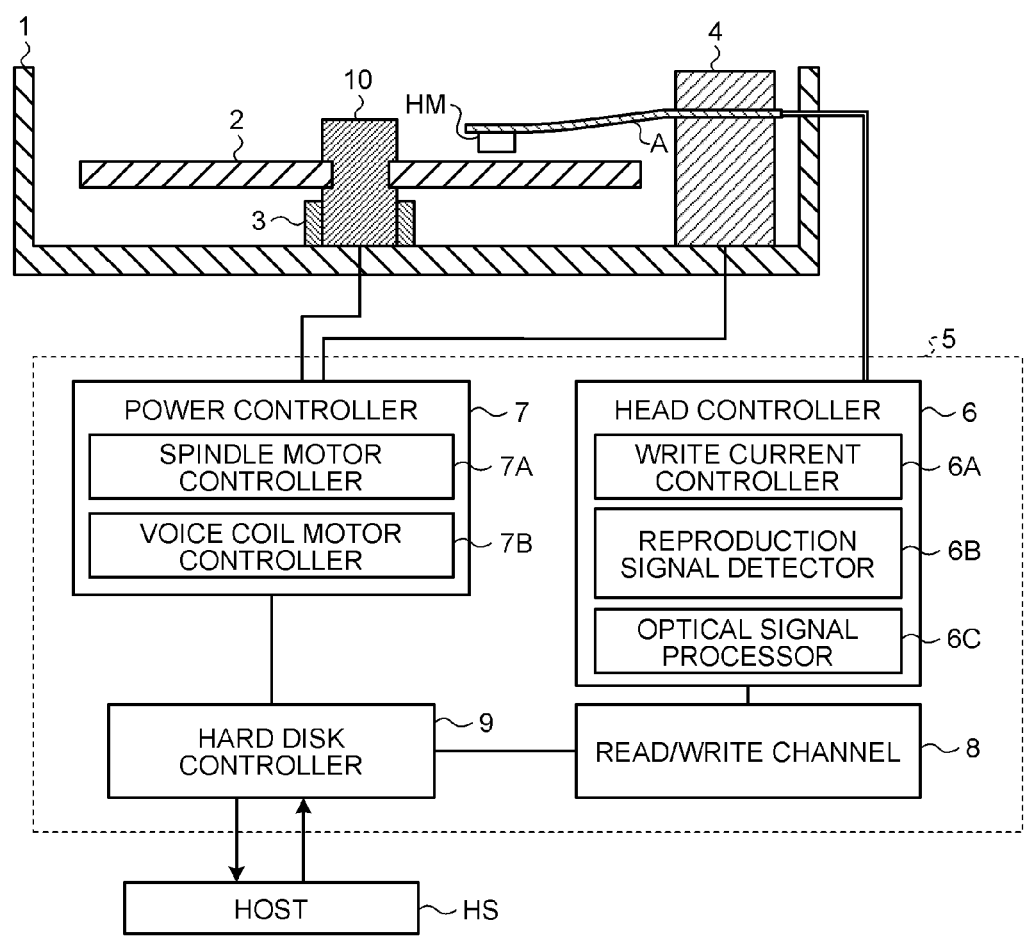
FIG. 1 is a block diagram illustrating schematic structure of a magnetic disk device according to a first embodiment.

FIG. 1 is a block diagram illustrating the schematic structure of a magnetic disk device according to a first embodiment.

In FIG. 1, the magnetic disk device includes a magnetic disk 2 and the magnetic disk 2 is supported through a spindle 10. In addition, the magnetic disk device includes a magnetic head HM and the magnetic head HM is held on the magnetic disk 2 through an arm A so as to face the magnetic disk 2. The arm A can slide the magnetic head HM in the horizontal plane.

Figure 2A:
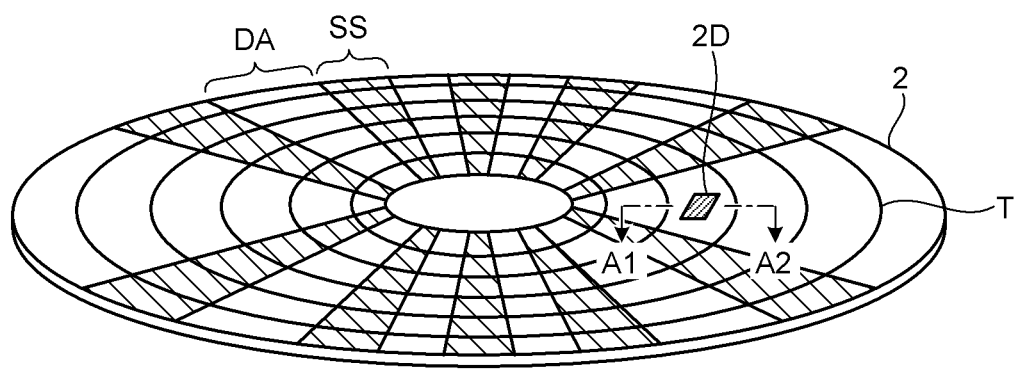
FIG. 2A is a perspective view illustrating schematic structure of a magnetic disk illustrated in FIG. 1.
Figure 2B:
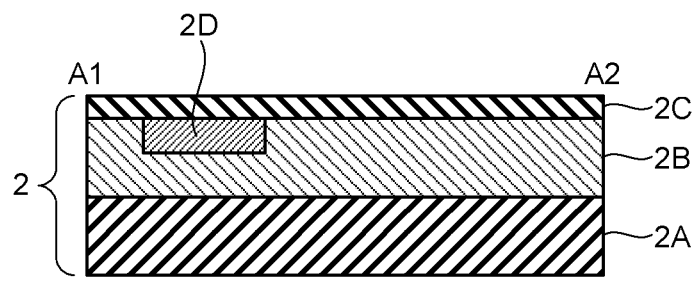
FIG. 2B is a cross-sectional view taken along the line A1-A2 of FIG. 2A.

FIG. 2A is a perspective view illustrating the schematic structure of the magnetic disk illustrated in FIG. 1 and FIG. 2B is a cross-sectional view taken along the line A1-A2 of FIG. 2A.

As illustrated in FIG. 2A, tracks T are provided on the magnetic disk 2 along a circumferential direction. Each of the tracks T includes data areas DA to which user data is written and servo areas SS to which servo data is written. Here, the servo areas SS are radially arranged and the data area DA is arranged between the servo areas SS. For example, a preamble, a servo area mark, sector/cylinder information, and a burst pattern are written to the servo area SS. The sector/cylinder information can give the servo address of the magnetic disk 2 in the circumferential direction and the radial direction and can be used in seek control which moves the magnetic head HM to a target track. The burst pattern can be used in tracking control which positions the magnetic head HM in the range of a target track.

As illustrated in FIG. 2B, in the magnetic disk 2, a magnetic recording layer 2B is provided on a substrate 2A. The substrate 2A may be made of a non-magnetic material, such as glass, ceramic, or quartz. The magnetic recording layer 2B may be made of a magnetic material including metal, such as FePt, as a main component. A reflecting layer 2D with a higher near-field light reflectance than the magnetic recording layer 2B is provided in the magnetic recording layer 2B so as to be flat. The reflectance of the reflecting layer 2D for light with a wavelength of 808 nm may be set to be three to five times more than that of the magnetic recording layer 2B. The reflecting layer 2D is preferably made of elementary metal with high electric conductivity. For example, the reflecting layer 2D may be made of a metal material selected from Au, Ag, Cu, Al, and Cr. In addition, a plurality of reflecting layers 2D may be arranged on the same track T at an equal interval, or they may be arranged on the same cylinder. When a plurality of reflecting layers 2D are arranged, it is preferable that the reflecting layers 2D be arranged so as to pass below the magnetic head HM at an equal time interval when the magnetic disk 2 is rotated. A protective film 2C is formed on the magnetic recording layer 2B and the reflecting layer 2D. The protective film 2C may be made of a non-magnetic material, such as DLC (diamond-like carbon), which is transparent with respect to near-field light.

In addition, the magnetic disk device illustrated in FIG. 1 includes a voice coil motor 4 that drives the arm A and a spindle motor 3 that rotates the magnetic disk 2 through the spindle 10. The magnetic disk 2, the magnetic head HM, the arm A, the voice coil motor 4, the spindle motor 3, and the spindle 10 are accommodated in a case 1.

In addition, the magnetic disk device includes a magnetic recording controller 5. The magnetic recording controller 5 includes a head controller 6, a power controller 7, a read/write channel 8, and a hard disk controller 9. The head controller 6 includes a write current controller 6A, a reproduction signal detector 6B, and an optical signal processor 6C. The power controller 7 includes a spindle motor controller 7A and a voice coil motor controller 7B.

The head controller 6 can amplify or detect a signal during recording or reproduction. The write current controller 6A can control a write current flowing to the magnetic head HM. The reproduction signal detector 6B can detect the signal read by the magnetic head HM. The optical signal processor 6C can control the amount of floating of the magnetic head HM on the magnetic disk 2 on the basis of the detection result of the near-field light reflected from the reflecting layer 2D.

The power controller 7 can drive the voice coil motor 4 and the spindle motor 3. The spindle motor controller 7A can control the rotation of the spindle motor 3. The voice coil motor controller 7B can control the driving of the voice coil motor 4.

The read/write channel 8 can transmit and receive data between the head controller 6 and the hard disk controller 9. Examples of the data may include read data, write data, and servo data. For example, the read/write channel 8 can convert the signal reproduced by the magnetic head HM into a data format treated by a host HS, or convert the data output from the host HS into a signal format recorded by the magnetic head HM. Examples of the format conversion may include DA conversion or encoding. In addition, the read/write channel 8 can decode the signal reproduced by the magnetic head HM or encode the data output from the host HS.

The hard disk controller 9 can control recording and reproduction on the basis of instructions from the outside of the magnetic disk device or transmit and receive data between the outside and the read/write channel 8.

A signal is read from the magnetic disk 2 through the magnetic head HM and is detected by the reproduction signal detector 6B. The signal detected by the reproduction signal detector 6B is converted by the read/write channel 8 and is then transmitted to the hard disk controller 9. The hard disk controller 9 performs tracking control such that the magnetic head HM traces the track T, on the basis of the servo data detected by the reproduction signal detector 6B.

When data is written to the magnetic disk 2, near-field light is emitted to the magnetic recording layer 2B through the magnetic head HM. Then, the magnetic field is formed on the magnetic recording layer 2B through the magnetic head HM while the magnetic recording layer 2B is locally heated on the basis of the near-field light. In this way, magnetic recording is performed on the locally heated region.

At that time, when the magnetic head HM passes on the reflecting layer 2D, the near-field light is reflected from the reflecting layer 2D. Then, the optical signal processor 6C controls the amount of floating of the magnetic head HM on the magnetic disk 2 on the basis of the detection result of reflected light of the near-field light.

The amount of reflected light of the near-field light is increased by the reflecting layer 2D provided in the magnetic recording layer 2B, and it is possible to increase a variation in the amount of reflected light of the near-field light corresponding to the distance between the magnetic head HM and the magnetic disk 2. Therefore, it is possible to improve the detection accuracy of the distance between the magnetic head HM and the magnetic disk 2 and thus improve the accuracy of controlling the amount of floating of the magnetic head HM on the magnetic disk 2.

Figure 3:
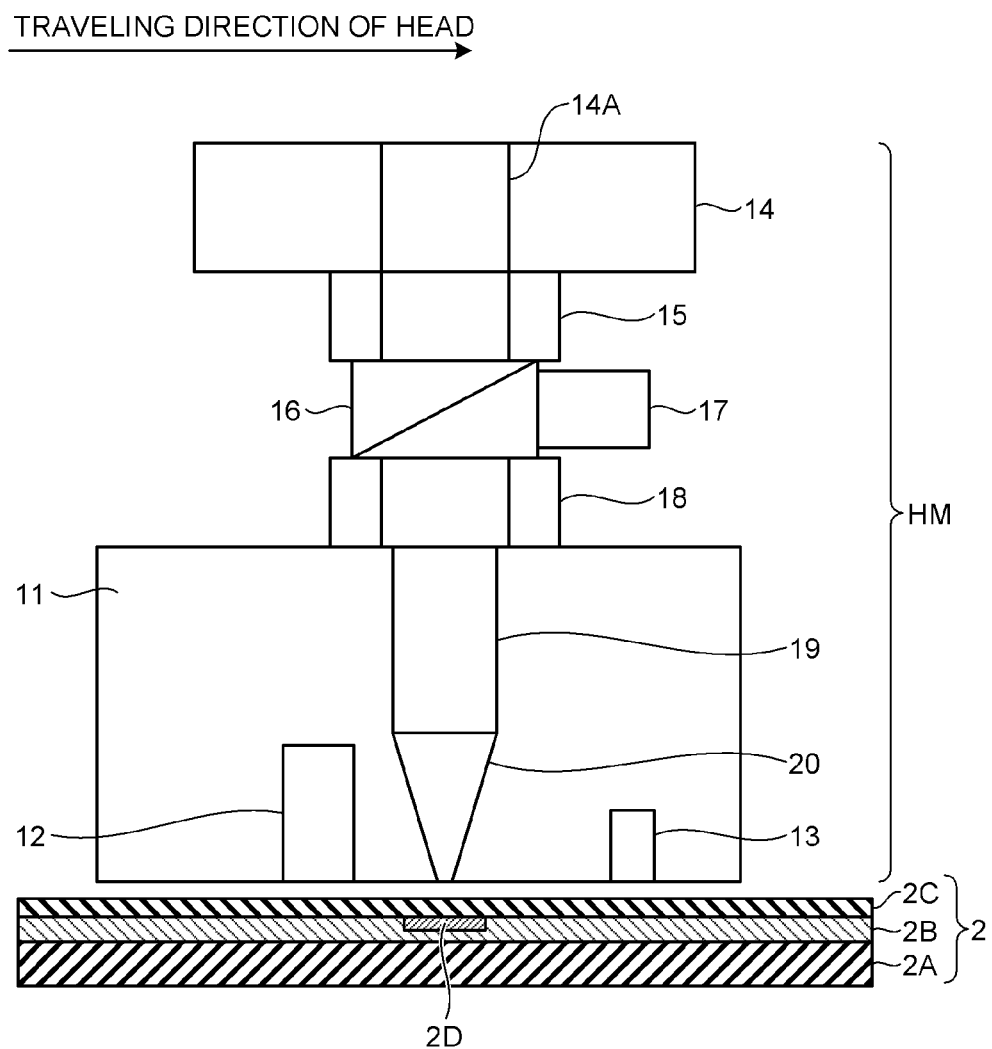
FIG. 3 is a side view illustrating schematic structure of a magnetic head illustrated in FIG. 1.
Figure 4:
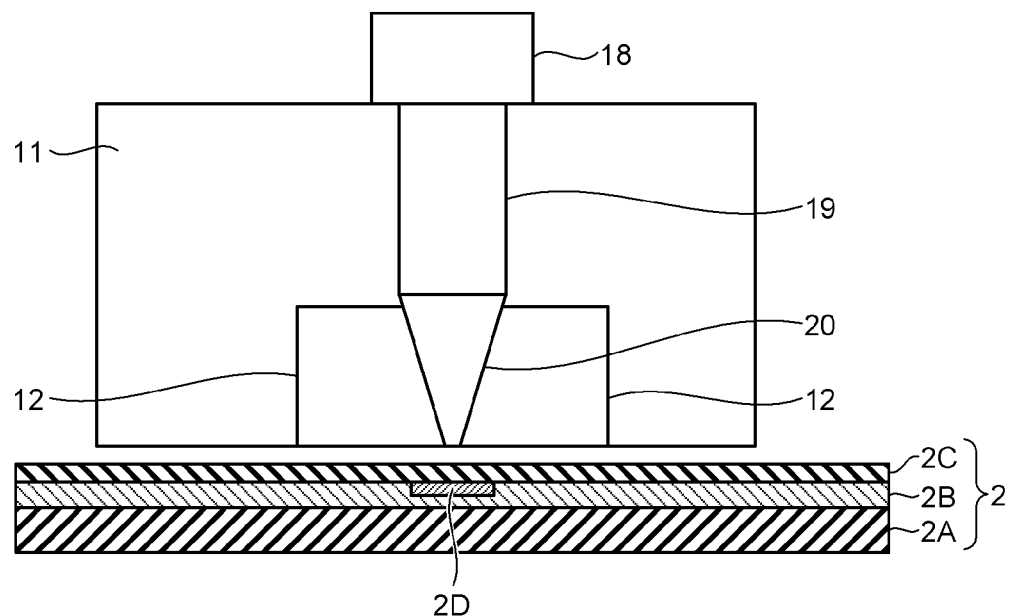
FIG. 4 is a front view illustrating schematic structure of the magnetic head illustrated in FIG. 1.

FIG. 3 is a side view illustrating the schematic structure of the magnetic head illustrated in FIG. 1 and FIG. 4 is a front view illustrating the schematic structure of the magnetic head illustrated in FIG. 1.

In FIGS. 3 and 4, the magnetic head includes a recording core 12, a reproduction head 13, a laser diode 14, a resonator 14A, optical waveguides 15, 18, and 19, a beam splitter 16, a photodetector 17, and a near-field light generating element 20. The recording core 12, the reproduction head 13, and the near-field light generating element 20 are supported by a slider 11 so as to face the magnetic disk 2. The slider 11 can be expanded or contracted according to the intensity of laser light from the laser diode 14. For example, a photodiode can be used as the photodetector 17. The near-field light generating element 20 may be made of elementary metal with high electric conductivity, such as Au, Ag, or Al, in order to improve the generation efficiency of the near-field light. Here, it is preferable that the reflecting layer 2D and the near-field light generating element 20 may be made of the same material in order to increase the amount of reflected light of the near-field light.

The optical waveguides 15, 18, and 19 and the beam splitter 16 are provided between the laser diode 14 and the near-field light generating element 20 and the beam splitter 16 is provided between the optical waveguides 15 and 18. In addition, the laser diode 14 is provided with the resonator 14A and is arranged such that the optical path of the resonator 14A is aligned with the leading end of the near-field light generating element 20. The photodetector 17 is provided on the side of the beam splitter 16.

Laser light emitted from the laser diode 14 sequentially passes through the optical waveguide 15, the beam splitter 16, and the optical waveguides 18 and 19 and is incident on the near-field light generating element 20. The near-field light generating element 20 generates near-field light and emits the near-field light to the magnetic recording layer 2B. Then, the magnetic recording layer 2B is locally heated. Here, when the magnetic head HM passes on the reflecting layer 2D, the near-field light is reflected from the reflecting layer 2D. The reflected light of the near-field light sequentially passes through the optical waveguides 19 and 18 and the beam splitter 16, is incident on the photodetector 17, and is then detected by the photodetector 17. Then, the optical signal processor 6C controls the amount of floating of the magnetic head HM on the magnetic disk 2 on the basis of the detection result of the photodetector 17.

Figure 5:
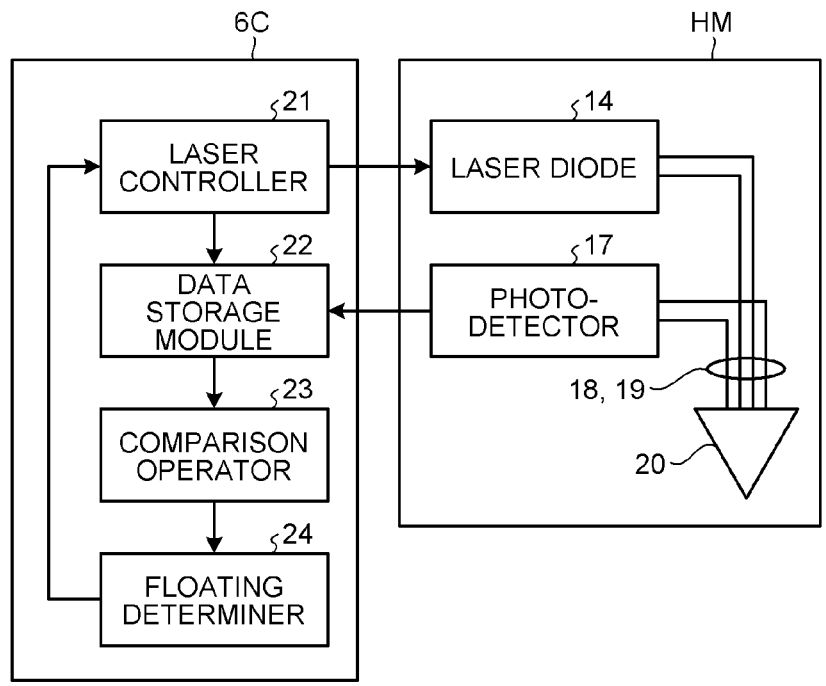
FIG. 5 is a block diagram illustrating schematic structure of an optical signal processor illustrated in FIG. 1.

FIG. 5 is a block diagram illustrating the schematic structure of the optical signal processor illustrated in FIG. 1.

In FIG. 5, the optical signal processor 6C includes a laser controller 21, a comparison module 22, a comparison operator 23, and a floating determiner 24. The laser controller 21 controls the laser current of the laser diode 14 to control the optical output of the laser diode 14. The photodetector 17 detects light which is proportional to the intensity of the near-field light reflected from the reflecting layer 2D and the data storage module 22 stores the detection result. The comparison operator 23 calculates a variation in the amount of reflected light of the near-field light on the basis of the detection result of the photodetector 17. The floating determiner 24 determines the amount of floating of the magnetic head HM on the magnetic disk 2 on the basis of the variation in the amount of reflected light of the near-field light. The floating determiner 24 directs the laser controller 21 to set the laser current such that the magnetic head HM does not contact the magnetic disk 2. Here, when the magnetic head HM is too close to the magnetic disk 2, the laser controller 21 reduces the laser current to reduce the expansion of the slider 11. Therefore, it is possible to increase the distance between the magnetic disk 2 and the magnetic head HM.

Figure 6A:
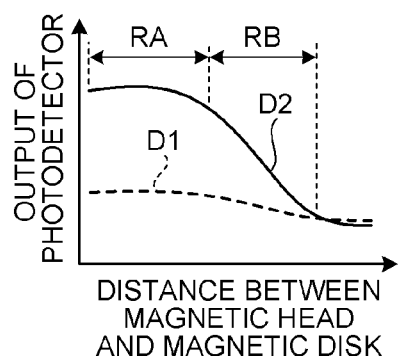
FIG. 6A is a diagram illustrating relation between distance between the magnetic disk and the magnetic head illustrated in FIG. 1 and output of a photodetector according to whether a reflecting layer is provided.
Figure 6B:
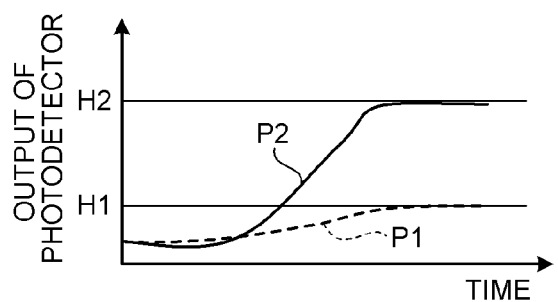
FIG. 6B is a diagram illustrating a variation in output of the photodetector when the magnetic head illustrated in FIG. 1 contacts the magnetic disk according to whether the reflecting layer is provided.

FIG. 6A is a diagram illustrating the relation between the distance between the magnetic disk and the magnetic head illustrated in FIG. 1 and the output of the photodetector according to whether the reflecting layer is provided. FIG. 6B is a diagram illustrating a variation in the output of the photodetector when the magnetic head illustrated in FIG. 1 contacts the magnetic disk in a direction in which it faces the magnetic disk according to whether the reflecting layer is provided.

In FIG. 6A, when the distance between the magnetic disk 2 and the magnetic head HM is short, the output D2 of the photodetector 17 when the reflecting layer 2D is provided is more than the output D1 of the photodetector 17 when the reflecting layer 2D is not provided. Therefore, as illustrated in FIG. 6B, the output H2 of the photodetector 17 during contact with the disk at the output P2 of the photodetector 17 over time when the reflecting layer 2D is provided is more than the output H1 of the photodetector 17 during contact with the disk at the output P1 of the photodetector 17 over time when the reflecting layer 2D is not provided.

As such, when the reflecting layer 2D is provided in the magnetic recording layer 2B, it is possible to increase a variation in the output of the photodetector 17 according to the distance between the magnetic head HM and the magnetic disk 2. Therefore, it is possible to improve the detection accuracy of the distance between the magnetic head HM and the magnetic disk 2 and thus improve the accuracy of controlling the amount of floating of the magnetic head HM on the magnetic disk 2.

FIG. 7 is a flowchart illustrating an output power calculation method when the magnetic head illustrated in FIG. 1 contacts the magnetic disk.

In FIG. 7, after a variable n is set to an initial value=0, the laser controller 21 sets the output power (n) of the laser diode 14 (S1). Then, the detector output (n) detected by the photodetector 17 is output to the storage module 22 (S2). Then, the comparison operator 23 calculates the reference gradient SK0 of the detector output (n) (S3). The reference gradient SK0 can be given as (detector output (n)–(0))/(output power (n)–(0)). The reference gradient SK0 is stored together with a determination coefficient for adjusting the reference gradient SK0 (S4). A reference value can be calculated in the subsequent process (S10) using the determination coefficient and the reference gradient SK0.

Then, it is determined whether the output power (n) is equal to or more than reference power (S5). When the output power (n) is not equal to or more than the reference power, the variable n is increased by 1 (S6) and the process from S1 to S6 is repeated until the output power (n) is equal to or more than the reference power. In FIG. 6A, the reference power can be set to RB in the range in which the gradient of the detector output (n) has linearity.

When the output power (n) is equal to or more than the reference power, the laser controller 21 sets the output power (n) of the laser diode 14 (S7). Then, the detector output (n) detected by the photodetector 17 is output to the storage module 22 (S8). Then, the comparison operator 23 reads the detector output (n) from the storage module 22 and calculates the gradient SK1 of the detector output (n) (S9). The gradient SK1 can be given as (detector output (n)–(n–1))/(output power (n)–(n–1)).

Then, it is determined whether the gradient SK1 is equal to or less than the reference value (S10). When the gradient SK1 is not equal to or less than the reference value, the variable n is increased by 1 (S11) and the process from S7 to S11 is repeated until the gradient SK1 is equal to or less than the reference value.

When the gradient SK1 is equal to or less than the reference value, the output power (n) at that time is used as contact power (S12). Then, the laser controller 21 controls the laser current such that the output power (n) is not equal to or more than the contact power. In this way, it is possible to prevent the contact of the magnetic head HM with the magnetic disk 2. Here, the gradient SK1 is compared with the reference value to determine a reduction from the value when the gradient of the detector output (n) has linearity. Therefore, it is possible to prevent the magnetic head HM from being determined to contact the magnetic disk 2 in the vicinity of a flat portion RA of the gradient of the detector output (n) illustrated in FIG. 6A and thus prevent a determination error due to the flat portion RA of the gradient of the detector output (n) illustrated in FIG. 6A.

In the example illustrated in FIG. 7, the contact of the magnetic head HM is determined on the basis of the gradient of the detector output (n) with respect to the output power (n). However, the contact of the magnetic head HM may be determined on the basis of a difference in the detector output (n). According to this embodiment, since the reflecting layer 2D is provided in the magnetic recording layer 2B, it is possible to increase a variation in the output of the photodetector 17 according to the distance between the magnetic head HM and the magnetic disk 2 and thus improve the detection accuracy of the distance between the magnetic head HM and the magnetic disk 2.

Second Embodiment

FIG. 8 is a side view illustrating the schematic structure of a magnetic head used in a magnetic disk device according to a second embodiment.

In FIG. 8, a magnetic head HMa includes a laser diode 31 and a photodetector 32, instead of the laser diode 14, the optical waveguide 15, the beam splitter 16, and the photodetector 17 of the magnetic head HM illustrated in FIG. 3. The laser diode 31 includes a resonator 31A and an optical waveguide 31B which is provided in parallel to the resonator 31A. The photodetector 32 is provided on the rear side (the side opposite to an emission direction to a near-field light generating element 20) of the laser diode 31.

Optical waveguides 18 and 19 are provided between the laser diode 31 and the near-field light generating element 20.

In addition, the resonator 31A and the optical path of the optical waveguide 31B are arranged on the optical path of the optical waveguide 18.

Laser light emitted from the laser diode 31 sequentially passes through the optical waveguides 18 and 19 and is then incident on the near-field light generating element 20. The near-field light generating element 20 generates near-field light and emits the near-field light to a magnetic recording layer 2B. In this way, the magnetic recording layer 2B is locally heated. Here, when the magnetic head HMa passes on the reflecting layer 2D, the near-field light is reflected from the reflecting layer 2D. Reflected light of the near-field light sequentially passes through the optical waveguides 19, 18, and 31B, is incident on the photodetector 32, and is detected by the photodetector 32. According to this embodiment, since the reflected light of the near-field light is detected on the rear side of the laser diode 31, the beam splitter 16 illustrated in FIG. 3 is not needed and it is possible to reduce the size of the magnetic head HMa.

Third Embodiment

Figure 9:
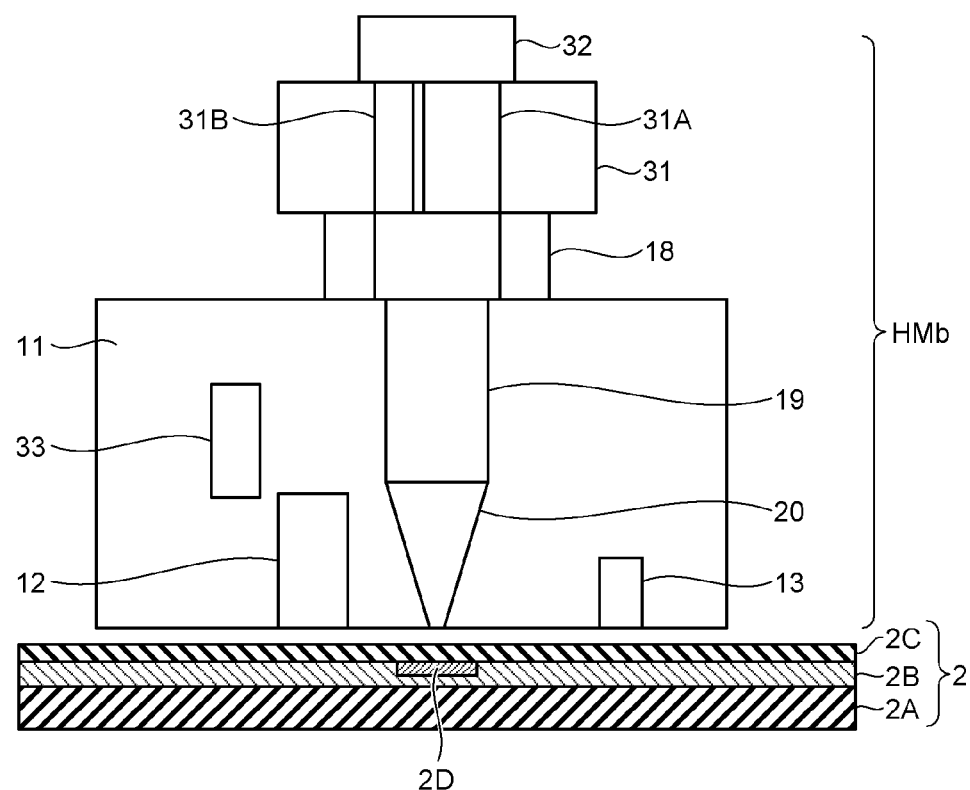
FIG. 9 is a side view illustrating schematic structure of a magnetic head used in a magnetic disk device according to a third embodiment.

FIG. 9 is a side view illustrating the schematic structure of a magnetic head used in a magnetic disk device according to a third embodiment.

In FIG. 9, a magnetic head HMb further includes a heater 33, as compared to the magnetic head HMa illustrated in FIG. 8. The heater 33 can heat a slider 11.

Figure 10:
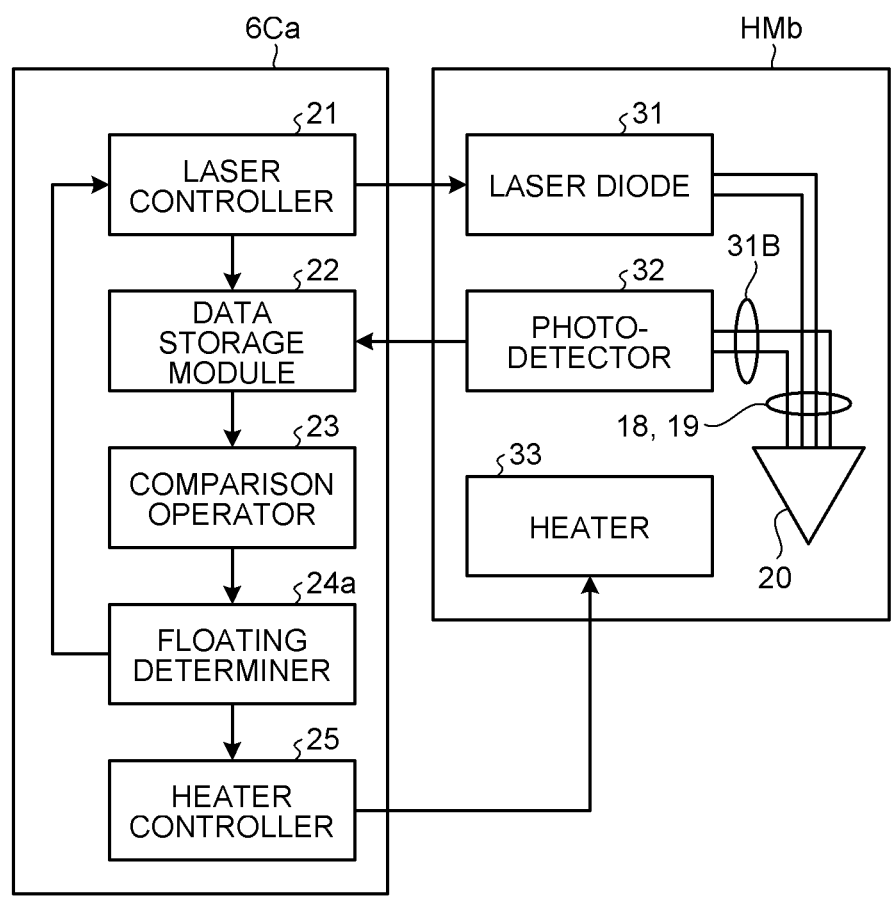
FIG. 10 is a block diagram illustrating schematic structure of an optical signal processor used in the magnetic disk device according to the third embodiment.

FIG. 10 is a block diagram illustrating the schematic structure of an optical signal processor used in the magnetic disk device according to the third embodiment.

In FIG. 10, an optical signal processor 6Ca further includes a heater controller 25, as compared to the optical signal processor 6C illustrated in FIG. 5, and includes a floating determiner 24a, instead of the floating determiner 24.

The floating determiner 24a determines the amount of floating of the magnetic head HMb on the magnetic disk 2 on the basis of a variation in the amount of reflected light of the near-field light calculated by a comparison operator 23. Then, the floating determiner 24a directs the laser controller 21 to set a laser current and directs the heater controller 25 to set a heater current such that the magnetic head HMb does not contact the magnetic disk 2. Here, when the magnetic head HMb is too close to the magnetic disk 2, the heater controller 25 reduces the heater current to reduce the expansion of the slider 11. In this way, it is possible to increase the distance between the magnetic disk 2 and the magnetic head HMb.

In the example illustrated in FIG. 9, the heater 33 is added to the magnetic head HMa illustrated in FIG. 8. However, the heater 33 may be added to the magnetic head HM illustrated in FIG. 3. According to this embodiment, since the heater current is controlled on the basis of a variation in the amount of reflected light of the near-field light, it is possible to increase the adjustment range of the distance between the magnetic head HMb and the magnetic disk 2, as compared to a case in which only the laser current is adjusted to control the expansion and contraction of the slider 11.

Fourth Embodiment

FIGS. 11A to 11D and FIGS. 12A to 12D are cross-sectional views illustrating a method of manufacturing a magnetic disk according to a fourth embodiment.

Figure 11A:
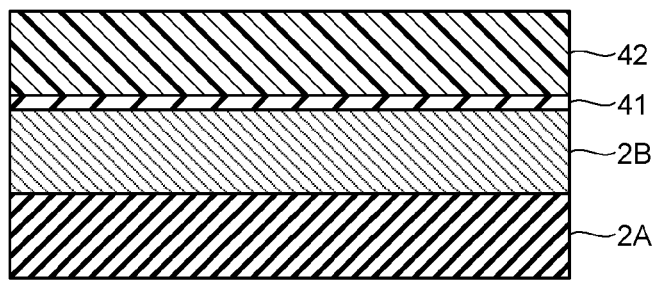
FIGS. 11A to 11D are cross-sectional views illustrating a method of manufacturing a magnetic disk according to a fourth embodiment.

In FIG. 11A, a magnetic recording layer 2B is formed on a substrate 2A by, for example, a sputtering method, a vapor deposition method, or a coating method. Then, a stopper layer 41 is formed on the magnetic recording layer 2B by, for example, a CVD method. The stopper layer 41 may be made of a material, for example, a silicon oxide film. The thickness of the stopper layer 41 may be set to about 1 nm. Then, a resist layer 42 is formed on the stopper layer 41 by, for example, a spin coating method. SOG (Spin On Glass) may be used as the resist layer 42. The thickness of the resist layer 42 may be set to about 100 nm.

Figure 11B:
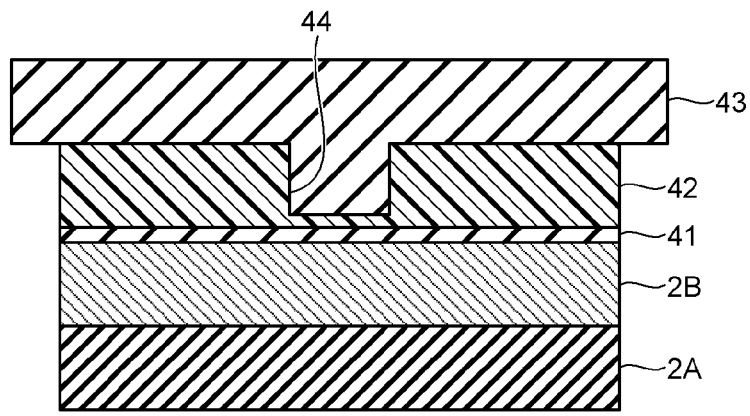

Then, as illustrated in FIG. 11B, a stamper 43 is pressed against the resist layer 42 to form a concave portion 44 in the resist layer 42.

Figure 11C:
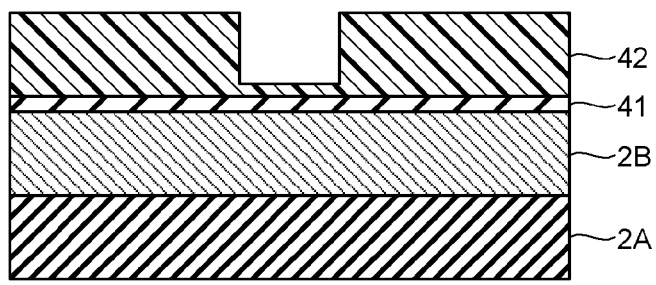
Figure 11D:
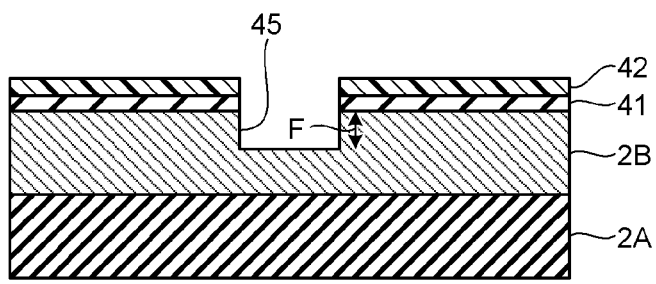

Then, as illustrated in FIG. 11C, the stamper 43 is removed from the resist layer 42. Then, as illustrated in FIG. 11D, the resist layer 42, the stopper layer 41, and the magnetic recording layer 2B are etched by, for example, an ion milling method using Ar gas as a raw material to form a concave portion 45 in the magnetic recording layer 2B. The depth F of the concave portion 45 may be set to, for example, 5 nm.

Figure 12A:
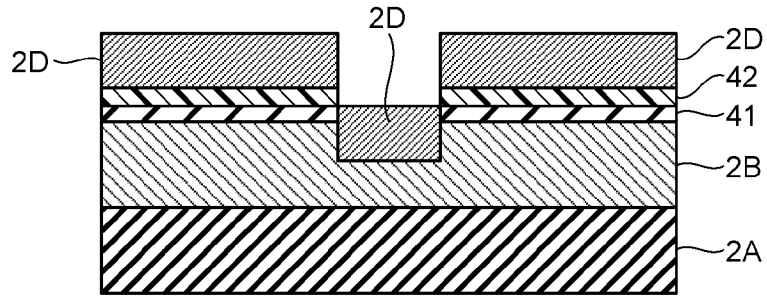
FIGS. 12A to 12D are cross-sectional views illustrating a method of manufacturing the magnetic disk according to the fourth embodiment.

Then, as illustrated in FIG. 12A, a reflecting layer 2D is formed on the resist layer 42 and the magnetic recording layer 2B by, for example, a sputtering method or a vapor deposition method such that the concave portion 45 is filled. At that time, the thickness of the reflecting layer 2D may be set to, for example, about 6 nm.

Figure 12B:
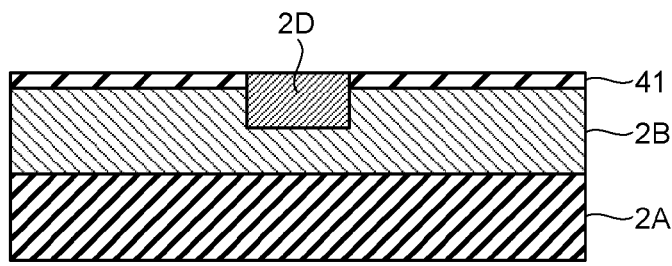

Then, as illustrated in FIG. 12B, the resist layer 42 and the reflecting layer 2D on the resist layer 42 are removed by, for example, an RIE method using oxygen gas as a raw material.

Figure 12C:
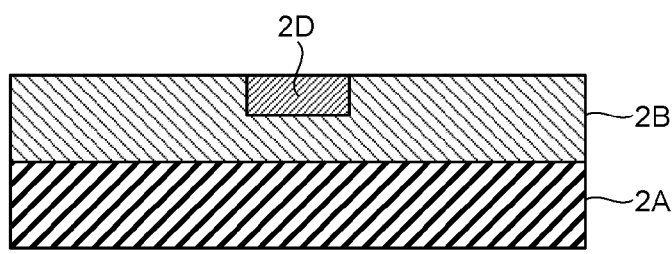

Then, as illustrated in FIG. 12C, the stopper layer 41 and reflecting layer 2D are partially etched by, for example, an ion milling method using Ar gas as a raw material to remove the stopper layer 41 and to reduce the thickness of the reflecting layer 2D such that the reflecting layer 2D is planarized with respect to the magnetic recording layer 2B. At that time, the amount of etching of the reflecting layer 2D may be set to about 1 nm.

Figure 12D:
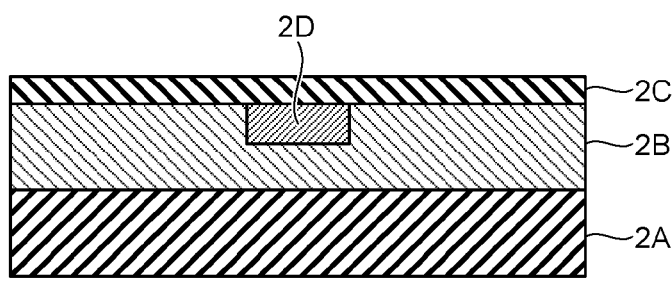

Then, as illustrated in FIG. 12D, a protective film 2C is formed on the magnetic recording layer 2B and the reflecting layer 2D by, for example, a plasma CVD method. For example, the thickness of the protective film 2C may be set to about 3 nm.

Fifth Embodiment

Figure 13A:
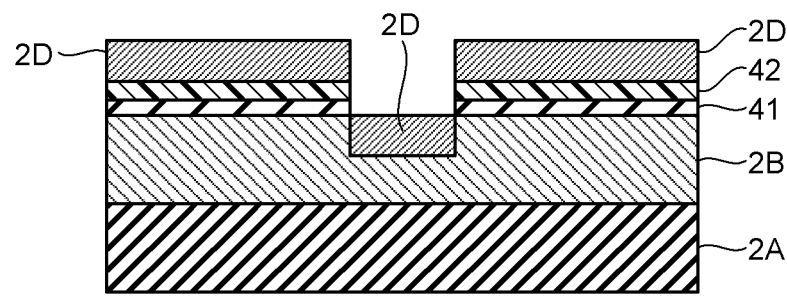
FIGS. 13A to 13C are cross-sectional views illustrating a method of manufacturing a magnetic disk according to a fifth embodiment.
Figure 13B:
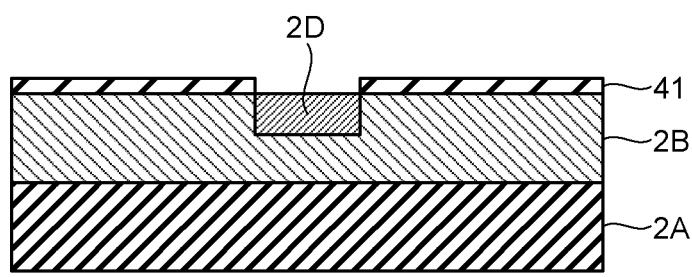
Figure 13C:
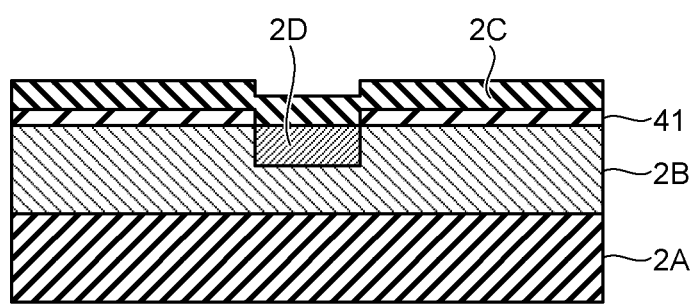

FIGS. 13A to 13C are cross-sectional views illustrating a method of manufacturing a magnetic disk according to a fifth embodiment.

In FIG. 13A, the same processes as those illustrated in FIGS. 11A to 11D are performed. Then, as illustrated in FIG. 13A, a reflecting layer 2D is formed on a resist layer 42 and the magnetic recording layer 2B by, for example, a sputtering method or a vapor deposition method such that a concave portion 45 is filled. At that time, the thickness of the reflecting layer 2D may be set to, for example, about 5 nm.

Then, as illustrated in FIG. 13B, the resist layer 42 and the reflecting layer 2D on the resist layer 42 are removed by, for example, an RIE method using oxygen gas as a raw material.

Then, as illustrated in FIG. 13C, a protective film 2C is formed on a stopper layer 41 and the reflecting layer 2D by, for example, a plasma CVD method. For example, the thickness of the protective film 2C may be set to about 3 nm.

Here, since the stopper layer 41 remains on the magnetic recording layer 2B, the process of removing the stopper layer 41 may not be performed and it is possible to reduce the number of processes.

Sixth Embodiment

FIGS. 14A to 14D and FIGS. 15A to 15C are cross-sectional views illustrating a method of manufacturing a magnetic disk according to a sixth embodiment.

Figure 14A:
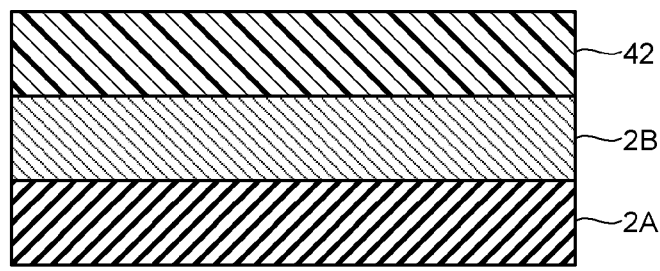
FIGS. 14A to 14D are cross-sectional views illustrating a method of manufacturing a magnetic disk according to a sixth embodiment.

In FIG. 14A, a magnetic recording layer 2B is formed on a substrate 2A by, for example, a sputtering method, a vapor deposition method, or a coating method. Then, the resist layer 42 is formed on the magnetic recording layer 2B by, for example, a spin coating method.

Figure 14B:
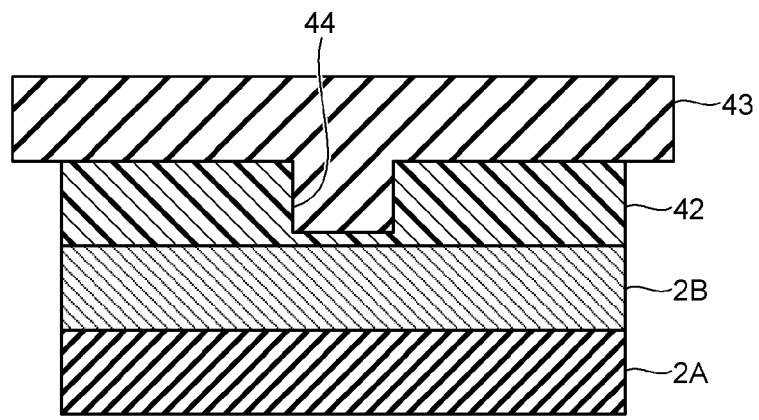

Then, as illustrated in FIG. 14B, a stamper 43 is pressed against the resist layer 42 to form a concave portion 44 in the resist layer 42.

Figure 14C:
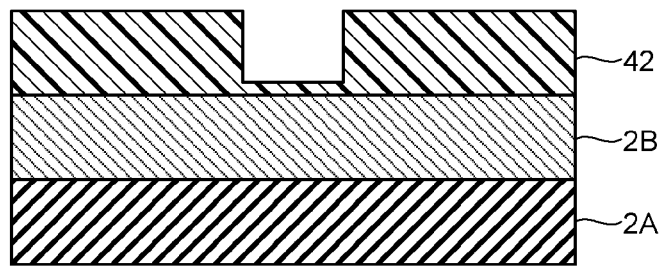
Figure 14D:
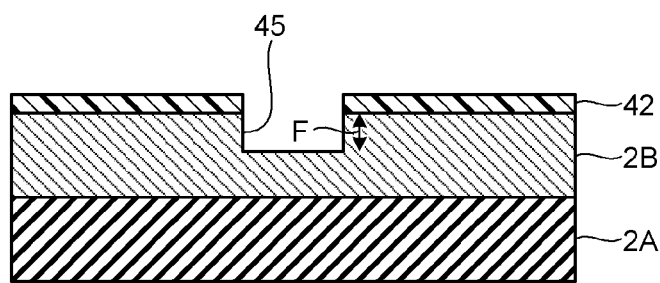

Then, as illustrated in FIG. 14C, the stamper 43 is removed from the resist layer 42. Then, as illustrated in FIG. 14D, the resist layer 42 and the magnetic recording layer 2B are etched by, for example, an ion milling method using Ar gas as a raw material to form a concave portion 45 in the magnetic recording layer 2B. For example, the depth F of the concave portion 45 may be set to about 5 nm.

Figure 15A:
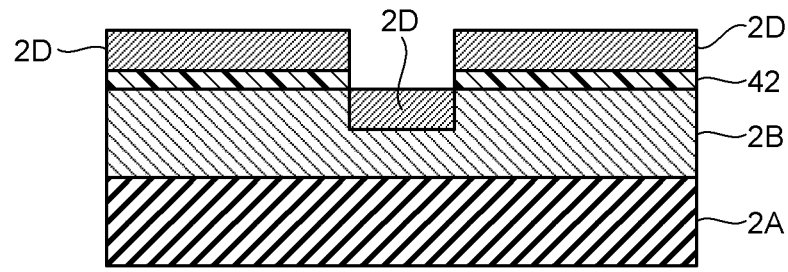
FIGS. 15A to 15C are cross-sectional views illustrating a method of manufacturing the magnetic disk according to the sixth embodiment.

Then, as illustrated in FIG. 15A, a reflecting layer 2D is formed on the resist layer 42 and the magnetic recording layer 2B by, for example, a sputtering method or a vapor deposition method such that the concave portion 45 is filled. At that time, the thickness of the reflecting layer 2D may be set to, for example, about 5 nm.

Figure 15B:
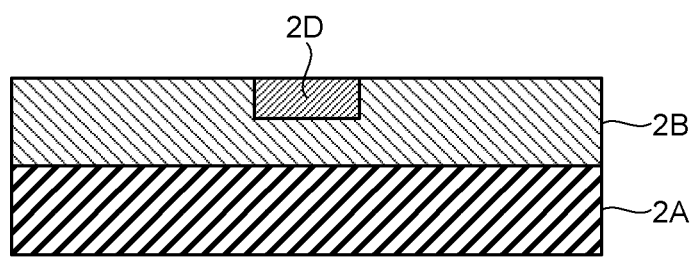

Then, as illustrated in FIG. 15B, the resist layer 42 and the reflecting layer 2D on the resist layer 42 are removed by, for example, an RIE method using oxygen gas as a raw material.

Figure 15C:
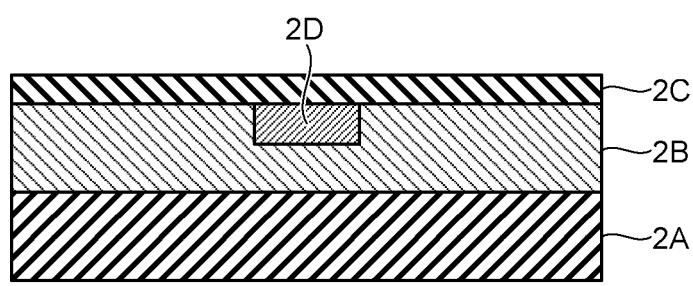

Then, as illustrated in FIG. 15C, a protective film 2C is formed on the magnetic recording layer 2B and the reflecting layer 2D by, for example, a plasma CVD method. For example, the thickness of the protective film 2C may be set to about 3 nm.

In this embodiment, the stopper layer 41 illustrated in FIG. 12A is not formed on the magnetic recording layer 2B and the resist layer 42 is formed on the magnetic recording layer 2B and the reflecting layer 2D. Therefore, the process of removing the stopper layer 41 may not be performed and it is possible to reduce the number of processes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk in which a reflecting layer with a higher reflectance to near-field light than a magnetic recording layer is provided in the magnetic recording layer so as to be flat;
   a magnetic head configured to perform magnetic recording on the magnetic recording layer while locally heating the magnetic recording layer based on the near-field light; and
   an optical signal processor configured to control an amount of floating of the magnetic head on the magnetic disk based on the detection result of light which is proportional to the near-field light reflected from the reflecting layer.

2. The magnetic disk device of claim 1, wherein the reflecting layer is made of elementary metal.

3. The magnetic disk device of claim 2, wherein the elementary metal is selected from Au, Ag, Cu, Al, and Cr.

4. The magnetic disk device of claim 1, wherein the magnetic head comprises:
   a near-field light generating element configured to generate the near-field light based on laser light emitted from a laser diode; and
   a photodetector configured to detect a light which is proportional to the near-field light reflected from the reflecting layer.

5. The magnetic disk device of claim 4, wherein the reflecting layer and the near-field light generating element are made of the same material.

6. The magnetic disk device of claim 4, wherein the optical signal processor comprises:
   a floating determiner configured to determine the amount of floating of the magnetic head based on the detection result of the light which is proportional to the near-field light by the photodetector; and
   a laser controller configured to control an optical output of the laser diode based on the determination result of the floating determiner.

7. A thermally assisted magnetic recording method comprising:
   controlling an amount of floating of a magnetic head on a magnetic disk in which a reflecting layer with a higher reflectance to near-field light than a magnetic recording layer is provided in the magnetic recording layer so as to be flat, based on the detection result of light which is proportional to the near-field light reflected from the reflecting layer; and
   performing magnetic recording on the magnetic recording layer while locally heating the magnetic recording layer based on the near-field light from the magnetic head whose floating amount is controlled.

8. The thermally assisted magnetic recording method of claim 7, wherein the reflecting layer is made of elementary metal.

9. The thermally assisted magnetic recording method of claim 8, wherein the elementary metal is selected from Au, Ag, Cu, Al, and Cr.

10. The thermally assisted magnetic recording method of claim 7, wherein the magnetic head is configured to generate the near-field light based on laser light emitted from a laser diode
    the method further comprises:
    detecting a light which is proportional to the near-field light reflected from the reflecting layer.

11. The thermally assisted magnetic recording method of claim 10, wherein the reflecting layer and a near-field light generating element that generates the near-field light are made of the same material.

12. The thermally assisted magnetic recording method of claim 10, further comprising:
    determining the amount of floating of the magnetic head based on the detection result of the light which is proportional to the near-field light; and
    controlling an optical output of the laser diode based on the determination result.

* * * * *